J. G. VINCENT.
GEAR CONTROL MECHANISM.
APPLICATION FILED AUG. 30, 1916. RENEWED AUG. 23, 1918.

1,282,332.  Patented Oct. 22, 1918.

Witness:
J.E.L. Blackmoy.

Inventor:
Jesse G. Vincent,
by Milton Tibbetts,
Atty.

UNITED STATES PATENT OFFICE.

JESSE G. VINCENT, OF DETROIT, MICHIGAN, ASSIGNOR TO PACKARD MOTOR CAR COMPANY, OF DETROIT, MICHIGAN, A CORPORATION OF MICHIGAN.

GEAR-CONTROL MECHANISM.

1,282,332.  Specification of Letters Patent.  Patented Oct. 22, 1918.

Application filed August 30, 1916, Serial No. 117,771. Renewed August 23, 1918. Serial No. 251,118.

*To all whom it may concern:*

Be it known that I, JESSE G. VINCENT, a citizen of the United States, and resident of Detroit, Wayne county, State of Michigan, have invented certain new and useful Improvements in Gear-Control Mechanism, of which the following is a specification.

This invention relates to improvements in motor vehicles and particularly to the means for gear control.

One of the objects of the present invention is to provide a gear control that extends well forward from the driver's seat to thereby give plenty of leg and foot room in the front compartment of the vehicle body.

Another object of the invention is to provide a gear control mechanism which is of simple construction and readily applied to the body and frame of a vehicle.

Other objects of the invention will appear from the following description taken in connection with the drawings, which form a part of this specification, and in which.

Figure 1:
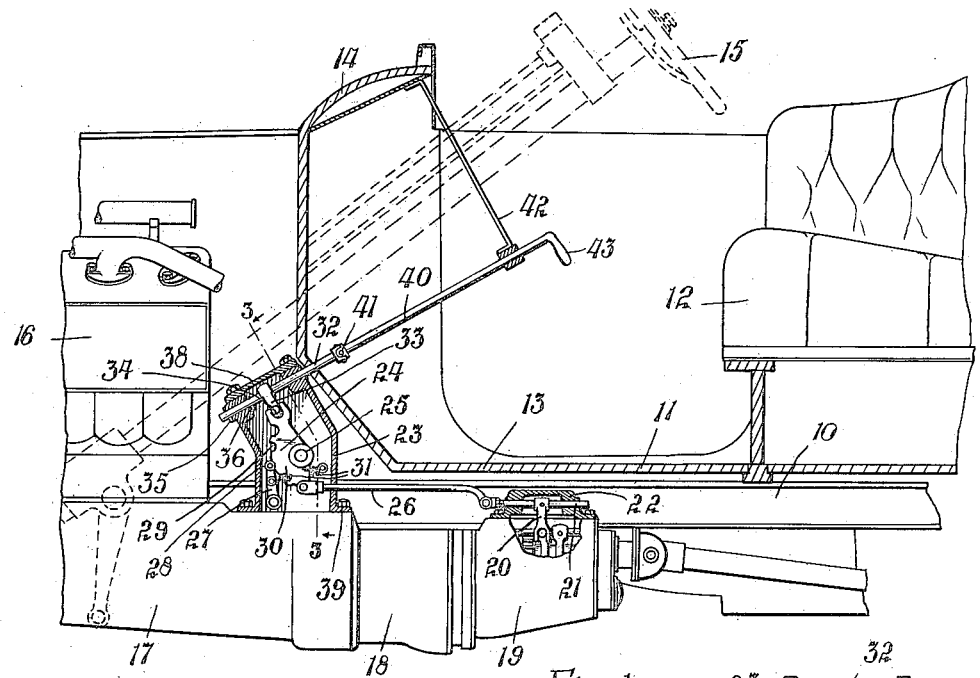
Figure 1 is a vertical longitudinal section with parts in elevation, of a motor vehicle embodying this invention.

Referring to the drawings, 10 represents a motor vehicle frame upon which rests a vehicle body 11 which may be removably secured to the frame. The body comprises the driver's seat 12, the floor boards 13, and the dash cowl 14. The steering gear of the vehicle is shown in dotted lines at 15.

The vehicle motor 16 is mounted forwardly of the vehicle body, and its base or support 17 is suitably mounted on the vehicle frame 10. A clutch housing 18 is secured to the rear end of the motor base, and a change speed gear mechanism 19 includes the casing which is secured to the rear end of the clutch housing. Thus the motor and its connected casings through to the change speed gear mechanism, is supported on the vehicle frame 10.

The change speed gear mechanism 19 may be of any usual type, including two gear shift arms 20, which are shown supported on sliding rods 21 in the cover 22 of the gear mechanism casing. In Fig. 1 the arms 20 are shown in neutral position and it will be understood that either of them may be shifted from said neutral position either forwardly or rearwardly to gear meshing positions.

Shown as mounted forwardly of the change speed gear mechanism 19 is a casing 23 resting upon a part of the motor base 17 beneath the dash of the vehicle body. In this casing a pair of gear shift levers 24 are mounted side by side and adapted to rock about an axis 25. The lower arms of these levers are connected by rods 26 with the rods 21 above referred to, so that the rods 21 may be moved by rocking the levers 24. These levers 24, rods 26, and sliding rods 21, with their arms 20, constitute gear shift elements which are adapted to slide the gears in the change speed gear mechanism 19. These gear shift elements are yieldingly retained in neutral position and in each of their gear positions by a pair of rock arms 27 mounted in the casing 23 and having roller studs 28 adapted to engage in suitable notches 29 in segmental portions 30 of the levers 24. Springs 31 hold these rock arms yieldingly in engagement with the levers.

The change speed gear mechanism 19 may be shifted from one gear position to another through the medium of the above described gear shift elements, by the movement of a rod 32, which is mounted in the casing 23 so that it may both oscillate and reciprocate. This rod has an arm 33, the end of which is adapted to engage in either of the slots 34 in the upwardly extending part of the levers 24. It will be understood that when the levers 24 are in neutral position the slots 34 will be alined as shown in Fig. 1, and the arm 33 of the rod 32 may then be moved into engagement with either of said levers. When the arm is in engagement with one of said levers the rod 32 may be reciprocated, or moved longitudinally of its axis, and the engaged lever 24 will thereby be rocked on its axis 25 and one of the sliding rods 21 will be shifted from neutral to gear engaging or meshing position. The reverse movement of the rod 32 will bring the gears back into neutral position.

Figure 2:
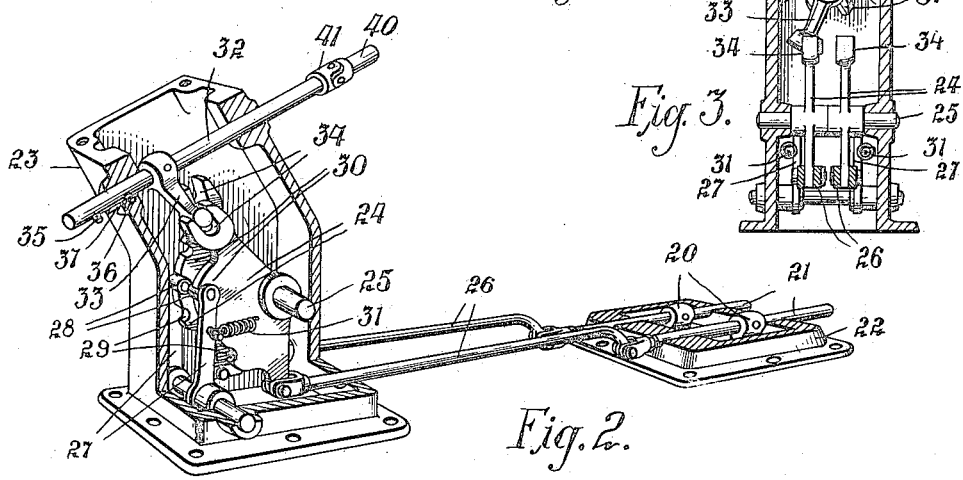
Fig. 2 is an enlarged perspective view of the gear control mechanism and its casing with parts cut away to more clearly illustrate the invention.
Figure 3:
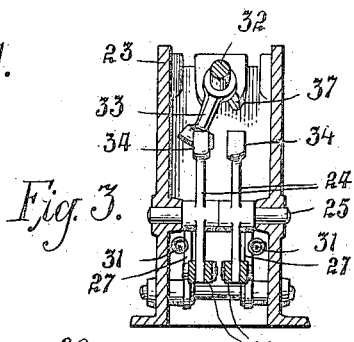
Fig. 3 is a substantially vertical transverse section on the line 3—3 of Fig. 1.

For the purpose of preventing the rod 32 from being reciprocated except when it is in full engagement with one of the levers 24 and from oscillating except when it is in neutral position, said rod is provided with pins 35 and 36 which operate in slots 37 in the casing 23. In Fig. 1 the rod 32 is shown in neutral position and the pins 35 and 36 prevent longitudinal movement. In Fig. 2 the rod 32 has been oscillated so that the pin 36 is in line with one of the slots 37, and the rod 32 has been moved longitudinally so that said pin 36 has moved into said slot 37. It will be seen that the rod 32 cannot now be oscillated due to the engagement of the pin 36 with the sides of the slot 37, but as soon as the rod 32 is returned to neutral position it is again free to oscillate.

It will be seen that the casing 23 is provided with a cover 38 which gives access to the working parts thereof. Also the casing is removably secured to the base 17 of the motor as by the bolts 39.

The shifter rod above referred to extends in a generally diagonal direction and it is adapted to be operated by a hand device 40 which is preferably connected to the shifter rod 32 by a flexible or universal joint 41. This connection permits of both the oscillation and reciprocation of the rod 32 by the hand device 40. The hand device is supported at its rear end from the dash cowl 14 as by a bracket 42, and a handle 43 forms the rear end of the device and is arranged adjacent the driver's seat 12 for convenient manipulation by the driver. Thus the hand device or shift lever 40 extends from adjacent the driver's seat 12 of the vehicle body diagonally forward through the body and into the casing 23, as described above, where it is in operative connection with the gear control mechanism in said casing. This leaves the front compartment of the vehicle free from encumbrances as it gives ample leg and foot room for the occupants. The flexible connection at 41 takes care of the slight misalinements that may occur in actual manufacture, thus facilitating the building and assembling of the parts.

Other forms of the invention may be made without departing from the spirit or scope of the invention.

Having thus described my invention what I claim and desire to secure by Letters Patent is:—

1. In a motor vehicle, in combination, a vehicle body, gear control mechanism arranged beneath the body, and a gear shifter lever adapted for longitudinal movement to shift the gear control mechanism and extending diagonally forward to an operative connection with said mechanism.

2. In a motor vehicle, in combination, a body, a change speed gear mechanism, a casing arranged forwardly of said mechanism, gear control mechanism in said casing and having connections extending to said gear mechanism, and a shift lever extending from adjacent the driver's seat of the body diagonally forward through the body and into said casing to an operative connection with said control mechanism.

3. In a motor vehicle, the combination with the vehicle frame, and the body thereon, of a motor having its base supported on the frame, a change speed gear mechanism connected to the motor, a casing mounted on the motor base, gear control mechanism in said casing and having connections to said gear mechanism, and a shift lever extending into said casing for operating said control mechanism.

4. In a motor vehicle, the combination, with the vehicle frame and the body thereon, of a motor having its base supported on the frame, a change speed gear mechanism connected to the motor, a casing mounted on the motor base, gear control mechanism in said casing and having connections to said gear mechanism, and a universally jointed shift lever extending into said casing for operating said control mechanism.

5. In a motor vehicle, the combination with the vehicle frame and the body thereon, of a motor having its base supported on the frame, a change speed gear mechanism connected to the motor, a casing mounted on the motor base, gear control mechanism in said casing including a pair of control levers and connections to said gear mechanism, and a shift lever extending into said casing for operating said control levers.

6. In a motor vehicle, in combination, a pair of gear shifter elements, levers connected thereto, a reciprocating and oscillating rod adapted to shift either of said levers separately, and a hand device flexibly connected to said rod.

7. In a motor vehicle, in combination, a pair of gear shifter elements, levers connected thereto, a reciprocating and oscillating rod adapted to shift either of said levers separately, and a hand device mounted on the vehicle body independently of the levers and flexibly connected to said rod.

8. In a motor vehicle, in combination, a pair of gear shifter elements, levers connected thereto, yielding devices for independently holding said levers in various positions of adjustment, and a shifter rod adapted to be connected with and shift either of said levers separately.

9. In a motor vehicle, in combination, a casing, gear shifter elements extending into said casing, a pair of levers connected to operate said elements, an oscillating and sliding rod mounted in said casing and having an arm adapted to engage and shift either of said levers, and a hand device adapted to operate said rod.

10. In a motor vehicle, in combination, a casing, gear shifter elements extending into said casing, a pair of levers connected to operate said elements, an oscillating and sliding rod mounted in said casing and having an arm adapted to engage and shift either of said levers and a hand device connected to said rod and adapted to rock the latter to engage one or the other of said levers and to reciprocate the rod to rock the engaged lever.

11. In a gear shift mechanism, in combination, a casing, a pair of gear shift elements therein, an oscillating and reciprocating rod mounted in said casing and having an arm adapted to engage and shift either of said elements separately, and a hand device adapted to operate said rod.

12. In a gear shift mechanism, in combination, a casing, a pair of gear shift elements therein, an oscillating and reciprocating rod mounted in said casing, and having an arm adapted to engage and shift either of said elements separately, and a hand device flexibly connected to and adapted to operate said rod.

13. In a gear shift mechanism, in combination, a casing, a pair of gear shift elements therein, an oscillating and reciprocating rod mounted in said casing and having an arm adapted to engage and shift either of said elements separately, and a hand device connected to oscillate said rod to engage one or the other of said elements and to reciprocate said rod to shift the engaged element.

In testimony whereof I affix my signature.

JESSE G. VINCENT.